Figure 1:
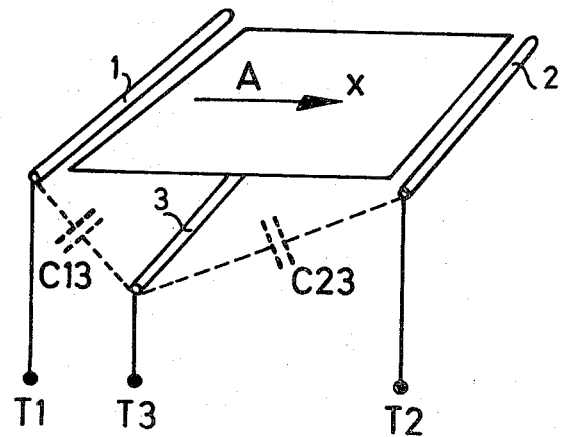

United States Patent [19]
Wahlgren

[11] 3,843,924
[45] Oct. 22, 1974

[54] APPARATUS FOR DETERMINING THE COORDINATES OF AN OBJECT, MOVEABLE ALONG AT LEAST ONE COORDINATE AXIS

[75] Inventor: Bjorn Wahlgren, Sodertalue, Sweden

[73] Assignee: Farad AB., Hagersten, Sweden

[22] Filed: Feb. 15, 1974

[21] Appl. No.: 442,853

Related U.S. Application Data
[63] Continuation of Ser. No. 290,696, Sept. 20, 1972, abandoned.

[52] U.S. Cl. ............... 324/61 R, 317/246, 340/200
[51] Int. Cl. ............................................ G01r 27/26
[58] Field of Search ........ 324/61 R, 61 P; 317/246; 340/200; 329/93

[56] References Cited
UNITED STATES PATENTS
| | | | |
|---|---|---|---|
| 1,984,166 | 12/1934 | Walter | 324/61 R X |
| 2,825,978 | 3/1958 | Davis | 324/61 R X |
| 2,877,397 | 2/1959 | Poschner et al. | 317/246 X |
| 2,892,152 | 6/1959 | Buisson | 324/61 R |
| 2,911,576 | 11/1959 | DeGiers | 324/61 P |
| 3,323,699 | 6/1967 | Bricker, Jr. | 324/61 R X |
| 3,466,391 | 9/1969 | Ellis | 324/61 R X |

FOREIGN PATENTS OR APPLICATIONS
| | | | |
|---|---|---|---|
| 685,366 | 4/1964 | Canada | 324/61 |

*Primary Examiner*—Stanley T. Krawczewicz

[57] ABSTRACT

To determine one coordinate of an object moveable in a single plane, three electrodes are spaced from each other and connected in a circuit to measure and compare the value of capacitance between one electrode and each of the other two electrodes; the electrodes are arranged so that the two values of capacitance are assymetrically changed by movement of the object in the direction of the measured coordinate while being unchanged by movement along the other coordinate. A second set of electrodes can be used to measure that other coordinate. Six electrodes can also be arranged to allow similar measurement and comparison of four capacitive values to determine a single coordinate of an object moveable in three-coordinate space.

2 Claims, 4 Drawing Figures

PATENTED OCT 22 1974

3,843,924

SHEET 2 OF 2

APPARATUS FOR DETERMINING THE COORDINATES OF AN OBJECT, MOVEABLE ALONG AT LEAST ONE COORDINATE AXIS

This application is a continuation of my copending application Ser. No. 290,696 filed Sept. 20, 1972, now abandoned.

The present invention refers to an apparatus for determining the coordinates of an object which is moveable along at least one coordinate axis. The apparatus of the invention is for instance intended to be used for determining the position of experimental animals moveable over a surface or within a space or for determining the movements of people within a room, to be observed with respect to movements or positions. In animal experiments within medicine, biology and phsychology one is often interested in determining the motoric activity of the animals within a longer or shorter period of time, for instance when studying the effect of different injected substances on the behavour of the animals. A number of methods for determining the activity are also known per se. It is for instance possible to place the animals on a suspended plate, the movements of the animals giving rise to vibrations of the plate, the vibrations affecting contacts of some suitable detecting instrument. It is also possible to registrer the activity of the animals photoelectrically or acoustically. Another method known per se consists in arranging inductive detectors, such as coils, under the surface where the animals are located, the movements of the animals affecting the inductance of the coils or their capacity to ground. It is also possible to use purely capacitive detectors. An example of such a device is described for instance in the Swedish Pat. application No. 3396/69 where the space in which the animals are located is provided with a high number of small differential capacitors, which are connected in parallel, the movements of the animals giving rise to changes of capacity of the capacitors, these variations being detected in some suitable instrument. The drawback of the hitherto described devices mainly consists therein that they only indicate the movements of the animals but do not give any more detailed information as to where the animal or group of animals are located on the surface. Certain information about the position of the animals could be obtained by using the devices known per se, if a number of such devices are arranged under the space where the animals are kept, the output signals from the different detectors being analysed separately. However, if an accurate determination of the positions is to be obtained this method will require a high number of detectors and thus be very costly.

It is an object of the present invention to provide an apparatus by means of which the coordinates of the experimental animals could be determined in a simple and unexpensive way.

Figure 2:
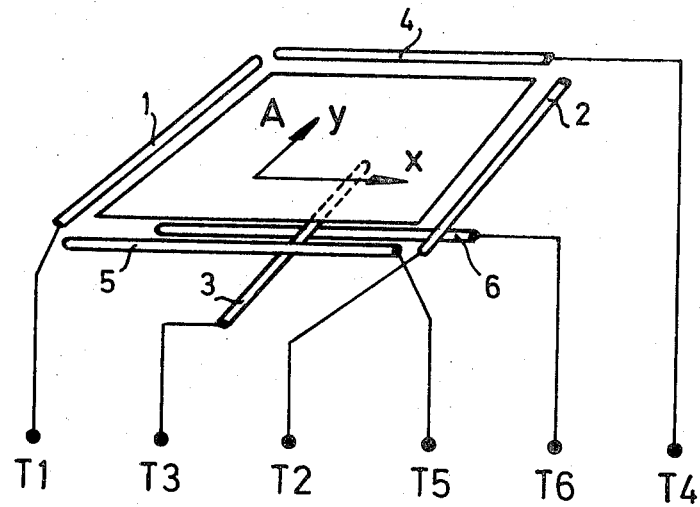
Figure 3:
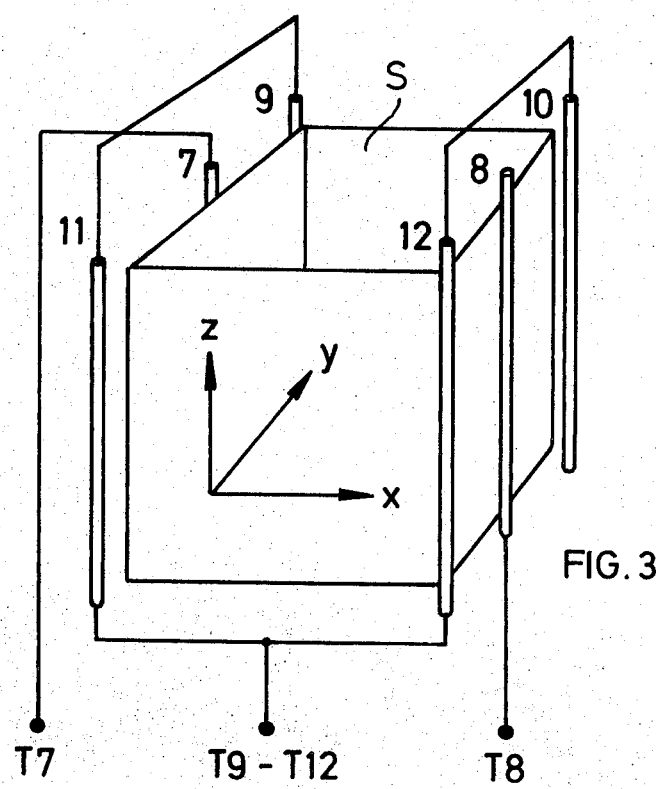
Figure 4:
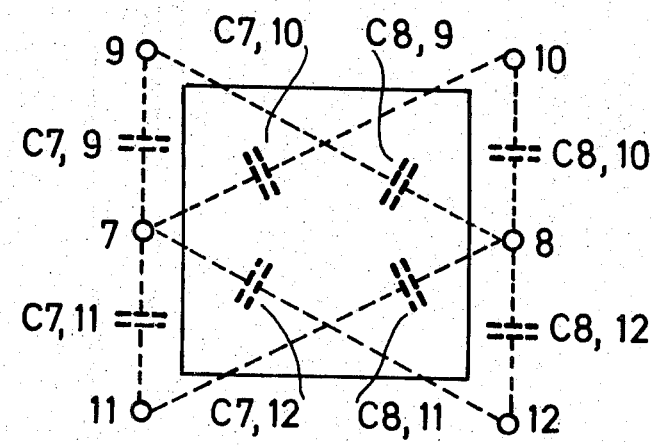

The invention will now be described in detail, reference being made to the enclosed drawing in which:

FIG. 1 schematically shows on embodiment of the apparatus according to the invention for determining one of the coordinates of an experimental animal moveable on a surface;

FIG. 2 in a corresponding way shows an apparatus for determining both coordinates of an animal moveable on the surface;

FIG. 3 schematically shows an apparatus for determining of one of the coordinates of an object which is moveable within a defined space; and FIG. 4 is a top view of the apparatus according to FIG. 3.

In FIG. 1 reference A denotes a plane surface, suitably made from some dielectrical material, on which an experimental animal is moveable. Two cylindrical electrodes 1 and 2 are arranged along opposite sides of the surface A, the extension of the electrodes somewhat exceeding that of the surface A. Under the surface A and symmetrically with respect to the electrodes 1 and 2 a third electrode 3 is arranged. In the figure the capacitances C13 and C23 obtained between the electrodes 1 and 3 and 2 and 3, respectively are also indicated. When no animal is located on the surface A these capacitances are equal for reasons of symmetry. They are also equal if the animals is located right above the electrode 3, i.e., on equal distances from the electrodes 1 and 2. If however, the animal is moving along the axis denoted $x$, a difference between the capacitances C13 and C23 will be obtained and this difference will form an unambiguous measure of the position of the animal with respect to the axis $x$, this being due to the fact that when the animal moves towards one of the electrodes 1 or 3 it will effect one of the capacitances more and more and the other less and less. This effect will be obtained thereby that the conductor 3 is not within the same plane as the electrodes 1 and 2. If namely the electrode 3 is located within the plane through the electrodes 1 and 2 or very close to this plane, the difference of capacity between the capacitances C13 and C23 will be effected only when the animal passes the electrode 3. With such a device it is thus only possible to determine if the animal is located in one or the other half of the surface A. In order to determine the difference of capacity of the differential capacitor C13–C23 the outputs T1 T2 and T3 respectively of the apparatus are suitably connected to a face indicating bridge known per se. (See for instance Swedish Pat. application No. 3396/69).

By combining two devices according to FIG. 1 it is in principle possible to determine both coordinates of an animal which is moveable over a surface. In FIG. 2 there is shown an embodiment of such a device. Components common to FIG. 1 thereby bear the same references as in that Figure. As appears from FIG. 2 the apparatus according to FIG. 1 has further been provided with a second set of electrodes 4 and 5 located along and outside the two remaining opposite sides of the surface A and a third electrode 6 arranged under the surface. By using the arrangement in FIG. 2 thus the second coordinate of the animal could be determined. In order not to obtain disturbing effects from one set of electrodes on the other set one suitably uses different frequences for measuring the capacitances within the respective sets of electrodes.

A drawback of the above described devices for determining the surface coordinates is that it could not simply be expanded for determining the three coordinates of an object moveable within a determined space. This is due to the fact that the apparatus according to FIG. 1 does also give rise to capacity variations when the object is moved vertically. The equipositional surfaces, i.e., the surfaces over which the object could be moved in space without affecting the capacitances are thus not planes but curved and if the object could be moved vertically the capacitance difference will not form an unambiguous measure of the x-coordinate of the object.

In FIG. 3 there is shown a box shaped space S within which the object, the position of which is to be determined, is presumed to be moveable. In order to determine the x-coordinate in a coordinate system xyz, the directions of which are indicated in the figure, six electrodes are arranged along two opposite sides of the box outside the same. Two electrodes 7 and 8, respectively are thereby arranged along the centre of the sides, whereas the remaining interconnected electrodes 9, 10, 11 and 12 are arranged symmetrically with respect to the first electrodes along the edges of the sides. As appears from FIG. 4, which shows the apparatus according to FIG. 3, seen from above one will thereby obtain a capacitance between the output T7 and the output T (9–12) which is formed by four part capacitances, namely the capacitances between the electrode 7 and the electrodes 9, 10, 11 and 12, respectively. In a corresponding way a capacitance is obtained between the outputs T8 and T (9–12) which is formed by four part capacitances between the electrode and the electrodes 9, 10, 11 and 12, respectively. If thereby the horizontal plane of the box (the plane shown in FIG. 4) is limited in such a way that the object to be detected could not be situated too close to the electrodes, the difference in capacitance between the electrodes T7 and T(9–12) and the electrodes T8 and T(9–12) respectively will be essentially independent of the movements of the object along the y-coordinate axis. For symmetry reasons the capacitances will further be independent of movement along the z-coordinate axis. By using the apparatus according to FIG. 3 one could thus unambiguously determine the x-coordinate of the object in the box. By combining three sets of electrodes according to FIG. 3 arranged along opposite sides of the box S one could thus determine the x- y- and z-coordinates respectively by determining the three capacitance differences obtained from the three sets of electrodes. In the same way as in the apparatus according to FIG. 2, the measurement of the capacities are thereby preferably made at different frequencies in order that the diffeerent measurements will not effect each other.

I claim:

1. Apparatus for determining at least one coordinate of a living organism moveable over a plane surface, characterized in, that the apparatus for each coordinate determination comprises three parallel rod-shaped capacitance electrodes, two of said electrodes arranged perpendicular to the respective coordinate axis along two opposite sides of the surface and outside said surface and the third rod-shaped electrode arranged in parallel with said first electrodes, and at equal distance from said electrodes but not in the same plane as these electrodes, said electrodes to be connected in an electrical circuit from which the object to be measured is excluded for measuring differences in values of capacity between one of the three electrodes and each of the respective remaining electrodes, the difference of capacitance between each of said first electrodes and said third constituting a measure of the coordinate of the object.

2. Apparatus according to claim 1, for determining at least one coordinate of a living organism moveable within a determined space, characterized in, that for each coordinate determination the apparatus comprises at least six parallel rod-shaped electrodes, the first two of said electrodes arranged perpendicular to the coordinate axis outside said space and at two opposite sides of the space, at least four further electrodes arranged outside said space, parallel to said first electrodes and symmetrically with respect to each other, the four further electrodes being electrically connected together, all of said electrodes to be connected in said electrical circuit, the difference of capacitance between each of said first electrodes and said four further electrodes constituting a measure of the coordinate of the object.

\* \* \* \* \*